US012453512B2

(12) United States Patent
Koenig

(10) Patent No.: US 12,453,512 B2
(45) Date of Patent: Oct. 28, 2025

(54) TUMOR ABLATION PLANNING USING INTERSTITIAL OPTICAL MAPPING

(71) Applicant: Medtronic Navigation, Inc., Louisville, CO (US)

(72) Inventor: Matthew W. Koenig, Denver, CO (US)

(73) Assignee: Medtronic Navigation, Inc., Louisville, CO (US)

(*) Notice: Subject to any disclaimer, the term of this patent is extended or adjusted under 35 U.S.C. 154(b) by 130 days.

(21) Appl. No.: 17/369,495

(22) Filed: Jul. 7, 2021

(65) Prior Publication Data

US 2022/0039744 A1  Feb. 10, 2022

Related U.S. Application Data

(60) Provisional application No. 63/061,933, filed on Aug. 6, 2020.

(51) Int. Cl.
*A61B 5/00* (2006.01)
*A61B 5/055* (2006.01)
(Continued)

(52) U.S. Cl.
CPC .......... *A61B 5/4887* (2013.01); *A61B 5/0035* (2013.01); *A61B 5/0036* (2018.08);
(Continued)

(58) Field of Classification Search
CPC ... A61B 5/4887; A61B 5/0036; A61B 5/0035; A61B 5/0071; A61B 5/0084;
(Continued)

(56) References Cited

U.S. PATENT DOCUMENTS 6,377,841 B1    4/2002  Lin et al.
8,241,272 B2*   8/2012  Arnold ................. A61B 18/245
                                                 606/14
(Continued)

FOREIGN PATENT DOCUMENTS

WO    2014130736        8/2014
WO    WO-2014130736 A1 *  8/2014  ......... A61B 1/00087
WO    2015114379        8/2015

OTHER PUBLICATIONS

International Search Report and Written Opinion dated Dec. 2, 2021 for PCT/US2021/044218.
Official Action for European Patent Application No. 21773909.3, dated Jul. 8, 2024, 4 pages.

*Primary Examiner* — Keith M Raymond
*Assistant Examiner* — Adam D. Kolkin
(74) *Attorney, Agent, or Firm* — Sheridan Ross P.C.

(57) ABSTRACT

Devices, systems, and methods to generate a plan for an interstitial laser ablation procedure are disclosed. The systems may be configured as an interstitial optical mapping system including a catheter, an emitter optical fiber, an imaging optical fiber, a light source, and a processing unit. The emitter optical fiber and the imaging optical fiber are used to interstitially image a fluorescent dye associated with a tumor, including the tumor margin, at discrete imaging positions along a length of the catheter. The processor calculates a location of the fluorescent dye at each discrete position and creates an optical map representing the tumor. The optical map is used to generate an interstitial laser ablation plan that includes laser fiber pull-back positions.

19 Claims, 5 Drawing Sheets

(51) Int. Cl.
  *A61B 18/24*  (2006.01)
  *A61B 18/00*  (2006.01)
  *A61B 18/20*  (2006.01)

(52) U.S. Cl.
  CPC .......... *A61B 5/0071* (2013.01); *A61B 5/0084* (2013.01); *A61B 5/055* (2013.01); *A61B 5/7425* (2013.01); *A61B 18/24* (2013.01); *A61B 2018/00577* (2013.01); *A61B 2018/2005* (2013.01)

(58) Field of Classification Search
  CPC .......... A61B 5/055; A61B 5/7425; A61B 8/24; A61B 2018/00577; A61B 2018/2005
  See application file for complete search history.

(56) References Cited

U.S. PATENT DOCUMENTS

| | | | |
|---|---|---|---|
| 9,179,985 B2 | 11/2015 | Hendriks et al. | |
| 9,980,698 B2 | 5/2018 | Koninklije | |
| 2003/0139661 A1* | 7/2003 | Kimchy | A61B 5/073 600/407 |
| 2007/0282404 A1 | 12/2007 | Cottrell et al. | |
| 2014/0094792 A1 | 4/2014 | Sharonov | |
| 2015/0305604 A1* | 10/2015 | Melsky | A61B 18/20 600/104 |
| 2016/0008057 A1 | 1/2016 | Peppou | |
| 2016/0051187 A1* | 2/2016 | Damadian | G01R 33/3806 600/420 |
| 2018/0064491 A1 | 3/2018 | Taylor et al. | |

\* cited by examiner

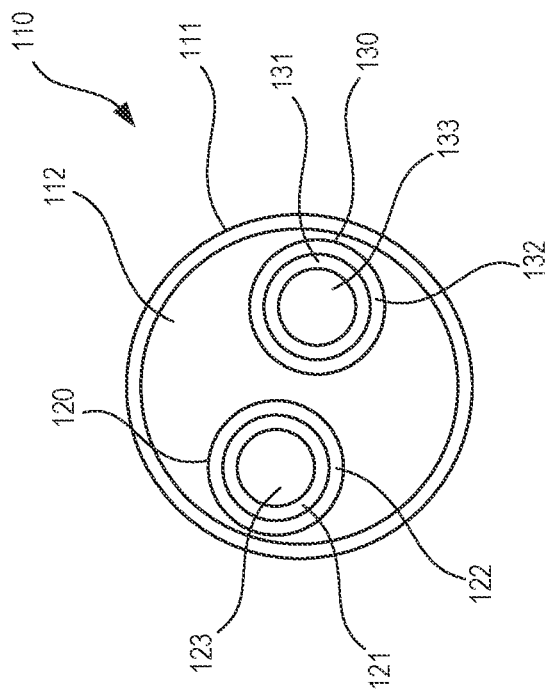
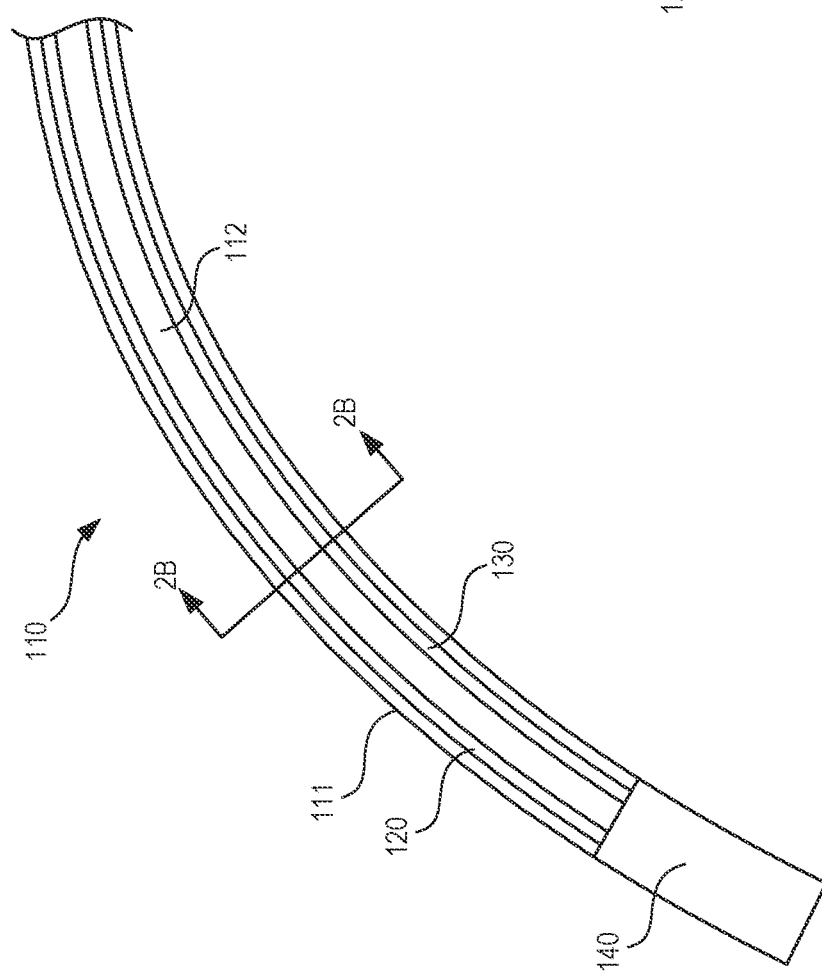
FIG. 2A
FIG. 2B

TUMOR ABLATION PLANNING USING INTERSTITIAL OPTICAL MAPPING

RELATED APPLICATION

The present application claims benefit of U.S. Provisional Patent Application No. 63/061,933, filed on Aug. 6, 2020 and titled, "TUMOR ABLATION PLANNING USING INTERSTITIAL OPTICAL MAPPING," the contents of this application are hereby incorporated by reference in its entirety.

TECHNICAL FIELD

The present disclosure relates generally to devices, systems, and methods used to treat a patient's tissue. More specifically, the present disclosure relates to devices, systems, and methods used to plan a tumor laser ablation procedure and/or to interstitially optically map a tumor, including tumor margin, using interstitial optical imaging and a fluorescent dye.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

FIG. 2A is a longitudinal cross-sectional view of a distal portion of an optical fiber probe of the interstitial optical mapping system of FIG. 1.

FIG. 2B is a transverse cross-sectional view at section 2B-2B of the optical fiber probe of FIG. 2A

DETAILED DESCRIPTION

Figure 1:
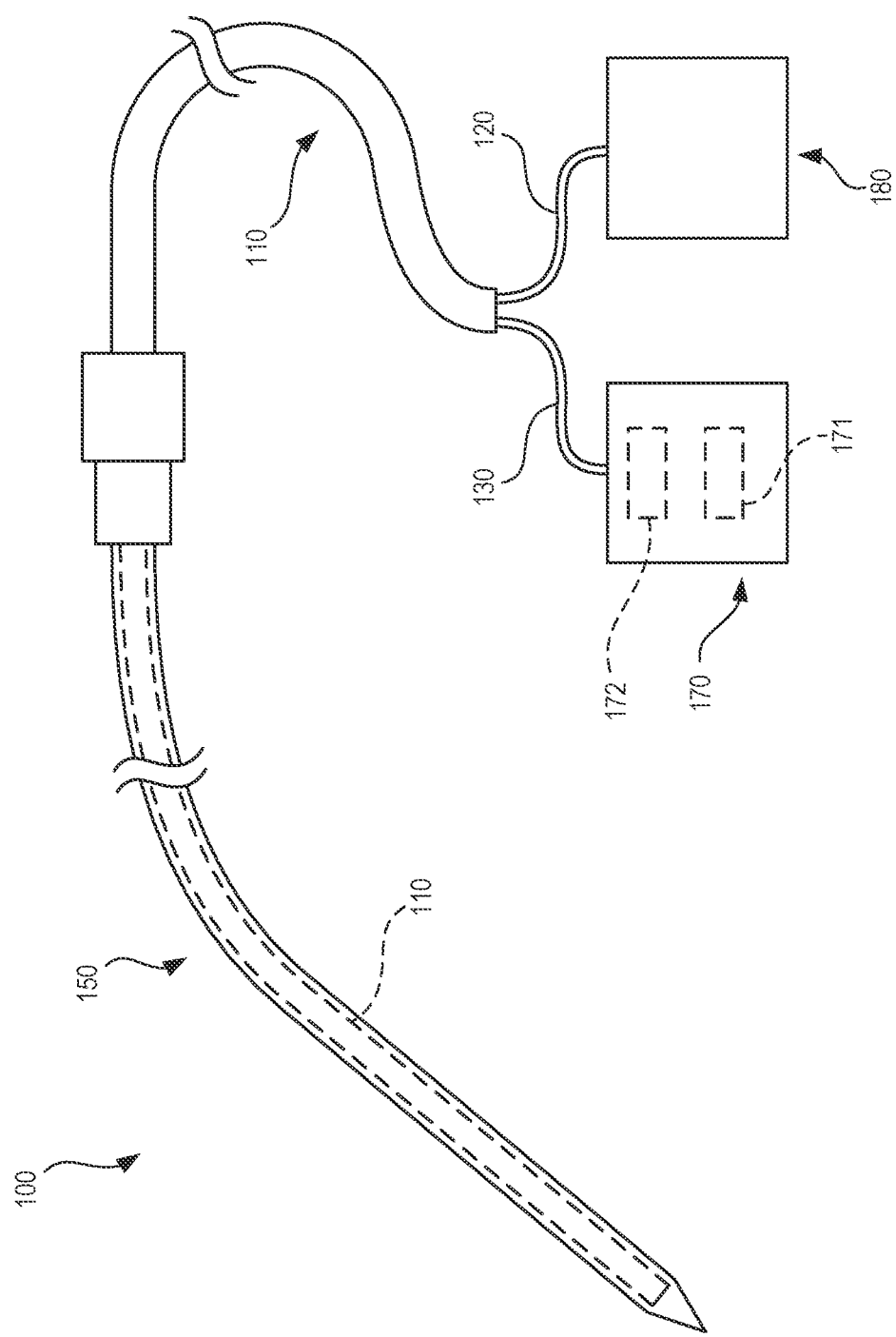
FIG. 1 is a side view of an interstitial optical mapping system.

Laser ablation, such as Laser Interstitial Thermal Therapy (LITT), is a technique for treating various tumors in the liver, the brain, the abdomen, and/or other regions of the body, as well as for treating benign lesions, such as prostate adenomas. In some therapies, a laser probe is inserted into a desired region (e.g., tumor) of treatment to deliver laser energy. After positioning the laser probe, laser energy may be emitted interstitially to irradiate target tissue and generate heat that leads to thermal tissue necrosis. Thus, LITT may be used to ablate a tumor via thermal energy generated from the laser energy while limiting side effects or additional damage to surrounding structures.

In certain instances, LITT utilizes magnetic resonance (MR) imaging to determine a margin of the tumor to be ablated and real-time MR thermometry to monitor progress of ablation of the tumor. However, in some instances the MR image may not sharply define the tumor margin, or define the margin within as fine a resolution as laser energy can be delivered, thus potentially resulting in ablation of non-diseased tissue surrounding the tumor and/or insufficient ablation of diseased tissue of the tumor. The ablation of non-diseased tissue may cause undesired patient morbidities, such as compromising of neural functions, seizures, excessive neural edema, etc. Insufficient ablation of the diseased tissue may cause other undesired patient morbidities, such as return of the tumor, metastasis of the tumor, death, etc.

Embodiments herein describe systems, methods, and apparatuses to assist in identifying the location of margins of a target tissue structure. The target tissue structure may include tissue that is to be ablated or tissue that is to be avoided and prevented from being ablated during an ablation procedure. While many of the examples herein describes the embodiments where the target tissue structure is a tumor to be ablated, the embodiments may be employed to protect target tissue structures that are not to be ablated.

In some embodiments, an interstitial optical tumor mapping system can be used to map the margin of the tumor to define a margin of the tumor and to plan an interstitial laser ablation procedure. The interstitial optical tumor mapping system can include an optical fiber probe that is disposed within a catheter disposed within or adjacent the tumor. In some embodiments, the optical fiber probe comprises an emitter optical fiber and an imaging optical fiber. The emitter optical fiber is configured to emit light from within the tumor (e.g., interstitially) to excite a fluorescent dye associated with the tumor, including the tumor margin. The imaging optical fiber is configured to receive reflected light from the fluorescent dye. The optical fiber probe is disposed within a catheter that is positioned within the tumor.

An optical map of the tumor and its margin can be formed by positioning the emitter optical fiber and the imaging optical fiber at a first discrete position and at least one other discrete position along a length of the catheter. At each discrete position, emitted light may be emitted interstitially from the emitter optical fiber to excite the fluorescent dye and reflected light may then be received by the imaging optical fiber. The reflected light is received by a processing unit, and a spectral analysis is conducted to calculate a position of fluorescent dye associated with the tumor. The position of the fluorescent dye of each of the discrete positions may in turn be compiled by the processing unit to form an optical map representing the tumor. The optical map can be correlated with an MR image of the tumor. The optical map and the MR image can be used in combination to generate an interstitial laser ablation plan that includes pull-back positions of a laser probe used to interstitially ablate the tumor.

The interstitial optical tumor mapping system can also be used to confirm ablation of the tumor and to generate an interstitial laser ablation plan to re-ablate the tumor if needed. Following tumor ablation, the optical fiber probe is re-inserted into the catheter and disposed at the first position within the tumor. An optical map of a position of non-ablated portions of the tumor associated with the fluorescent dye can be formed as the emitter optical fiber and the imaging optical fiber are translated to a plurality of discrete positions along the length of the catheter. At each discrete position, emitted light is emitted interstitially from the emitter optical fiber to excite the fluorescent dye and reflected light is received by the imaging optical fiber. The reflected light is received by a processing unit, and a spectral analysis is conducted to calculate a position of fluorescent dye associated with the non-ablated tumor portions. The position of the fluorescent dye of each of the discrete positions is compiled by the processing unit to form an optical map representing the non-ablated tumor portions. The optical map can be correlated with an MR image of the ablated tumor. The optical map and the MR image can be used in combination to generate an interstitial laser ablation plan that includes pull-back positions of a laser probe used to interstitially ablate the non-ablated tumor portions.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

The directional terms "distal" and "proximal" are given their ordinary meaning in the art. That is, the distal end of a medical device means the end of the device furthest from a practitioner during use. The proximal end refers to the opposite end or the end nearest the practitioner during use.

FIGS. 1-4B illustrate different views of several interstitial optical tumor devices and related components. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIGS. 1-4B illustrate an embodiment of an interstitial optical tumor mapping system 100. As depicted in FIG. 1, the interstitial optical tumor mapping system 100 in the illustrated embodiment comprises an optical fiber probe 110, a catheter 150, a processing unit 170, and a light source 180. Also, in the illustrated embodiment, the optical fiber probe 110 comprises an emitter optical fiber 120, an imaging optical fiber 130, and a light diffuser 140 in communication with the emitter optical fiber 120 and the imaging optical fiber 130. The processing unit 170 is in communication with the imaging optical fiber 130, and the light source 180 is in communication with the emitter optical fiber 120.

FIGS. 2A and 2B illustrate a distal portion of the optical fiber probe 110. As shown, the optical fiber probe 110 may include a tubular body 111 having a lumen 112 extending therethrough. The emitter optical fiber 120 may be disposed within the lumen 112. In the illustrated embodiment, the emitter optical fiber 120 includes a core 123 having a high refractive index, a cladding 121 surrounding the core 123 having a lower refractive index, and a protective jacket 122 surrounding the cladding 121. The core 123 and the cladding 121 can be formed from any suitable material, such as glass including pure silica glass, fluoride glass, phosphate glass, or chalcogenide glass; plastics, such as acrylic or polystyrene; or a combination of both. The protective jacket 122 can be formed from any suitable material, such as polyurethane, polyvinyl chloride, polyimide, etc. The core 123 may have a diameter ranging from about 10 microns to about 600 microns. A thickness of the cladding 121 can range from about 125 microns to about 630 microns. A thickness of the jacket 122 may range from about 250 microns to about 1040 microns. A proximal end of the emitter optical fiber 120 is in communication with the light source 180 such that emitted light is transmitted from the proximal end to a distal end.

The imaging optical fiber 130 may be disposed within the lumen 112 adjacent the emitter optical fiber 120. In the illustrated embodiment, the imaging optical fiber 130 includes a core 133 having a high refractive index, a cladding 131 surrounding the core 133 having a lower refractive index, and a protective jacket 132 surrounding the cladding 131. The core 133 and the cladding 131 can be formed from any suitable material, such as glass including pure silica glass, fluoride glass, phosphate glass, or chalcogenide glass; plastics, such as acrylic or polystyrene; or a combination of both. The protective jacket 132 can be formed from any suitable material, such as polyurethane, polyvinyl chloride, polyimide, etc. The core 133 may have a diameter ranging from about 10 microns to about 600 microns. A thickness of the cladding 131 can range from about 125 microns to about 630 microns. A thickness of the jacket 132 may range from about 250 microns to about 1040 microns. A proximal end of the imaging optical fiber 130 is in communication with the processing unit 170. The imaging optical fiber 130 is configured to transmit reflected light from a distal end to the proximal end.

In the illustrated embodiment, a light diffuser 140 is in communication with distal ends of the emitter optical fiber 120. The light diffuser 140 is configured to diffuse light emitted from the emitter optical fiber 120 into the tumor in a desired pattern, such as conical, 360 degrees side fire, 180 degrees side fire, 90 degrees side fire, and spherical. The light diffuser 140 can be of any suitable form to diffuse light. For example, the light diffuser 140 can be a cylindrical rod as depicted in FIG. 2A. In other embodiments, the light diffuser 140 can be a lens shaped to diffuse emitted light in a desired direction In some embodiments, the light diffuser 140 or a separate lens may be configured to direct reflected light to the imaging optical fiber 130. The light diffuser 140 or lens can be of any suitable form to receive light and can be shaped to receive reflected light from a desired direction.

Figure 3:
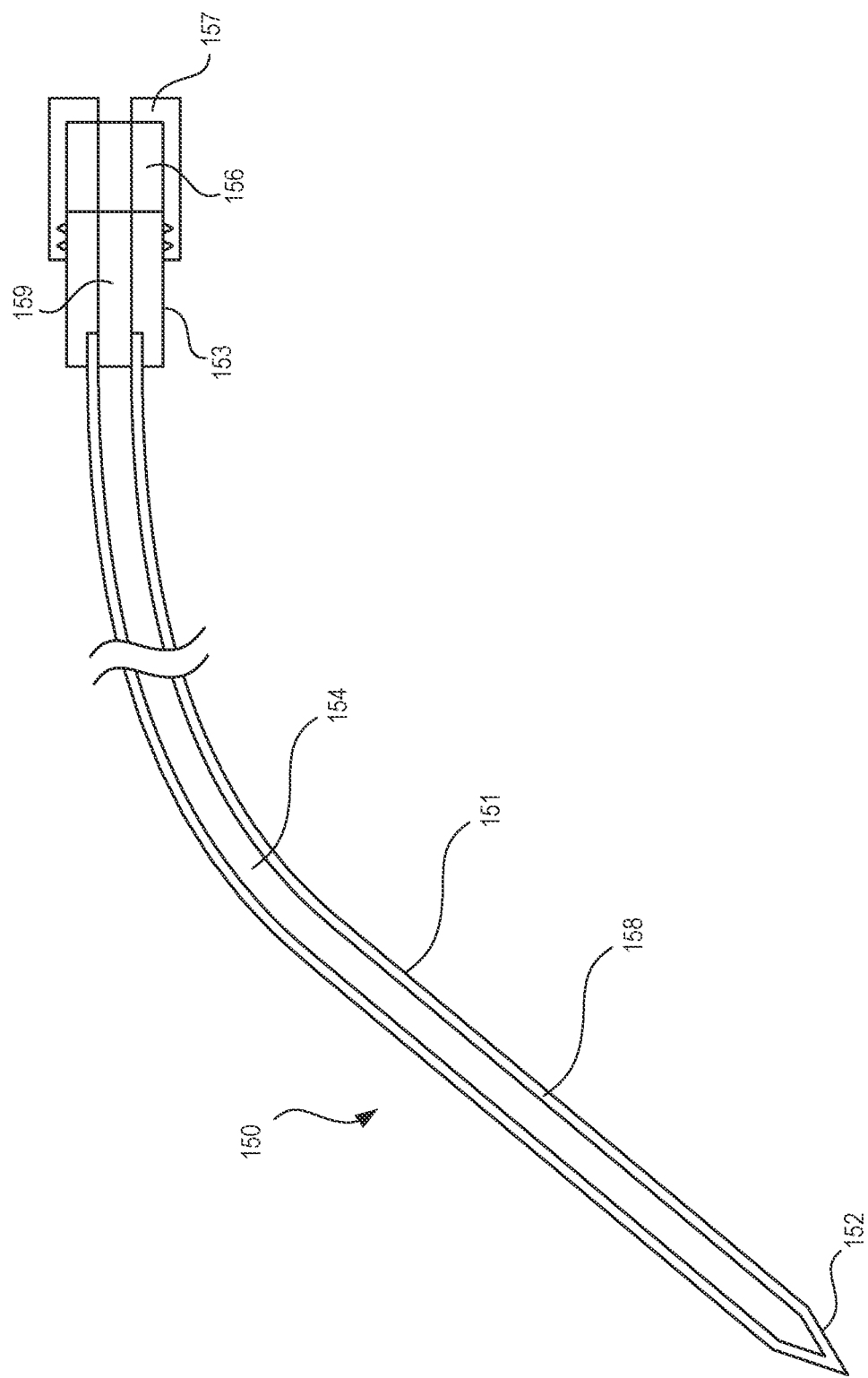
FIG. 3 is a longitudinal cross-sectional view of a catheter of the interstitial optical mapping system of FIG. 1.

As illustrated in FIG. 3, in some embodiments, the catheter 150 includes a tubular body 151 having a lumen 154 extending therethrough, a tip 152 disposed at a distal end of the body 151, and a connector 153 coupled to a proximal end of the body 151, as shown in FIG. 1. The body 151 may be formed from any suitable material that permits transmission of light through a wall 158 of the body 151. The lumen 154 has a diameter sized to slidingly receive the optical fiber probe 110.

As depicted in FIG. 3, the tip 152 may include a conical shape configured to pass through soft tissue without cutting or otherwise damaging the soft tissue. In other embodiments, the tip 152 includes any suitable shape that can pass through soft tissue without cutting or otherwise damaging the soft tissue. For example, the tip 152 may include a bullet nose shape, a beveled shape, or other suitable shape.

As shown in FIG. 3, in some embodiments the tip 152 is integral with the body 151 and can be formed from the same material as the body 151. The tip 152 can be formed by heat forming in a dye. In other embodiments, the tip 152 is a separate component and is fixedly coupled to the distal end of the body 151 using any suitable technique, such as welding, gluing, bonding, etc. In this embodiment, the tip 152 can be formed from a material different than the body 151. For example, the tip 152 of this embodiment may be formed from a material that is stiffer or softer than the material of the body 151 to improve insertability (e.g., trackability and/or pushability) of the catheter 150.

The connector 153 may include a bore 159 extending through the connector 153. The bore 159 is in fluid communication with the lumen 154. A seal member 156 may be disposed at a proximal end of the connector 153 within a threaded cap 157. The connector 153 is configured to secure the optical fiber probe 110 in a longitudinal position related to the catheter 150 and to provide a seal around the optical fiber probe 110. In some embodiments, the connector 153 includes a manifold in fluid communication with the lumen 154 such that fluid can be circulated within the lumen 154.

The processing unit 170, as shown in FIG. 1, is in communication unit with the imaging optical fiber 130 and configured to receive reflected light that is transmitted through the imaging optical fiber 130 from the tumor. The processing unit 170 may include an image sensor 172 configured to receive the reflected light from the imaging optical fiber 130 and a spectral analysis unit 171 configured to analyze data received from the image sensor 172 and calculate a position of the tumor. The reflected light can have a wavelength ranging from about 620 nm to about 710 nm.

As illustrated in FIG. 1, the light source 180 is in communication with the emitter optical fiber 120. The light source 180 can be configured to emit light capable of exciting the fluorescent dye associated with the tumor during an optical tumor mapping procedure. The emitted light may have a wavelength ranging from about 380 nm to about 450 nm, including from about 400 nm to about 410 nm.

The interstitial optical tumor mapping system 100 can be used to generate a laser ablation plan where a tumor (e.g., glioblastoma) within the brain of a patient is ablated using laser energy. Alternatively, the interstitial optical tumor mapping system 100 can be used to generate a laser ablation plan for a tumor within other locations of the body, such as in the liver, the abdomen, prostate, brain, and/or other regions of the body.

Figure 4A:
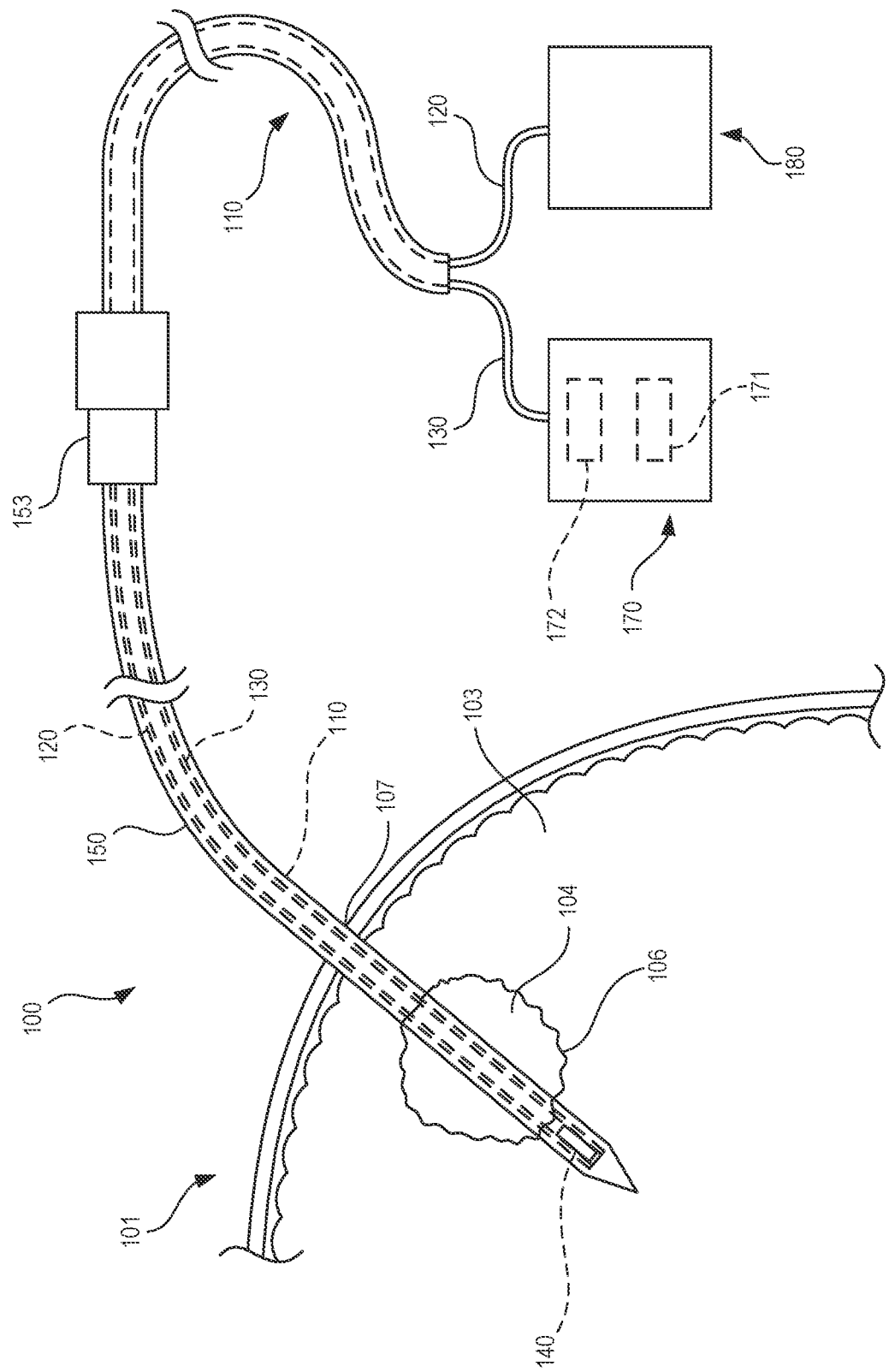
FIG. 4A is a partial cross-sectional view of the interstitial optical mapping system of FIG. 1 with a portion of the interstitial optical mapping system disposed within a tumor of a patient and an emitter optical fiber and an imaging optical fiber at a first discrete imaging position within the catheter.

The laser ablation plan can be generated by associating a fluorescent dye with a tumor 104 of a patient 101 and disposing the catheter 150 within the tumor 104 targeted for ablation, as depicted in FIG. 4A. In the illustrated embodiment of FIG. 4A, the tumor 104 is disposed within the brain 103 of the patient 101. In some embodiments, the fluorescent dye can be 5-aminolevulinic acid or any other suitable fluorescent dye. The catheter 150 is disposed through a bore hole 107 of the skull 102 of the patient 101 and disposed within the tumor 104 using any suitable technique known to a practitioner.

The optical fiber probe 110 may be disposed through the catheter 150. In some embodiments, the optical fiber probe 110 is selectively secured in a longitudinal position by the connector 153. The emitter optical fiber 120 and the imaging optical fiber 130 are disposed within the optical fiber probe 110.

In FIG. 4A, the optical fiber probe is positioned at a first imaging location relative to the catheter 150. The light source 180 is activated such that emitted light is transmitted through the emitter optical fiber 120. The emitted light is transmitted to the light diffuser 140, and the emitted light is diffused into the tumor 104 to excite the fluorescent dye. Reflected light from the excited fluorescent dye is received by the imaging optical fiber 130 and transmitted through the imaging optical fiber 130 to the processing unit 170. The spectral analysis unit 171 of the processing unit 170 performs a spectral analysis of data received from the image sensor 172 of the reflected light. The spectral analysis identifies areas of the tissue that are illuminated due to a concentration of the fluorescent dye within the tumor 104. The spectral analysis may identify non-cancerous tissue, the tumor, 104 and the tumor margin 106.

The processing unit 170 further calculates the position of the optical fiber probe and correlates the position with the results of the spectral analysis. The position may be determined relative to the catheter or an MR image. In some embodiments, the position is determined based on a position output from a robotic system configured to place and move the optical fiber probe. For example, the robotic system may indicate an amount of displacement from a first position to a second position. In some embodiments, the position is determined using MR imaging. In some embodiments, the position may be determined based on markers on the catheter 150. The markers may be visible symbols along a portion of the catheter 150 exterior the patient 101, or the symbols may be captured as part of the data received from the image sensor 172 in the reflected light.

The processing unit 170 may correlate the position and the results from the spectral analysis. For example, the processing unit 170 may record locations along the catheter 107 that are associated with non-cancerous tissue, the tumor, 104 and the tumor margin 106.

Figure 4B:
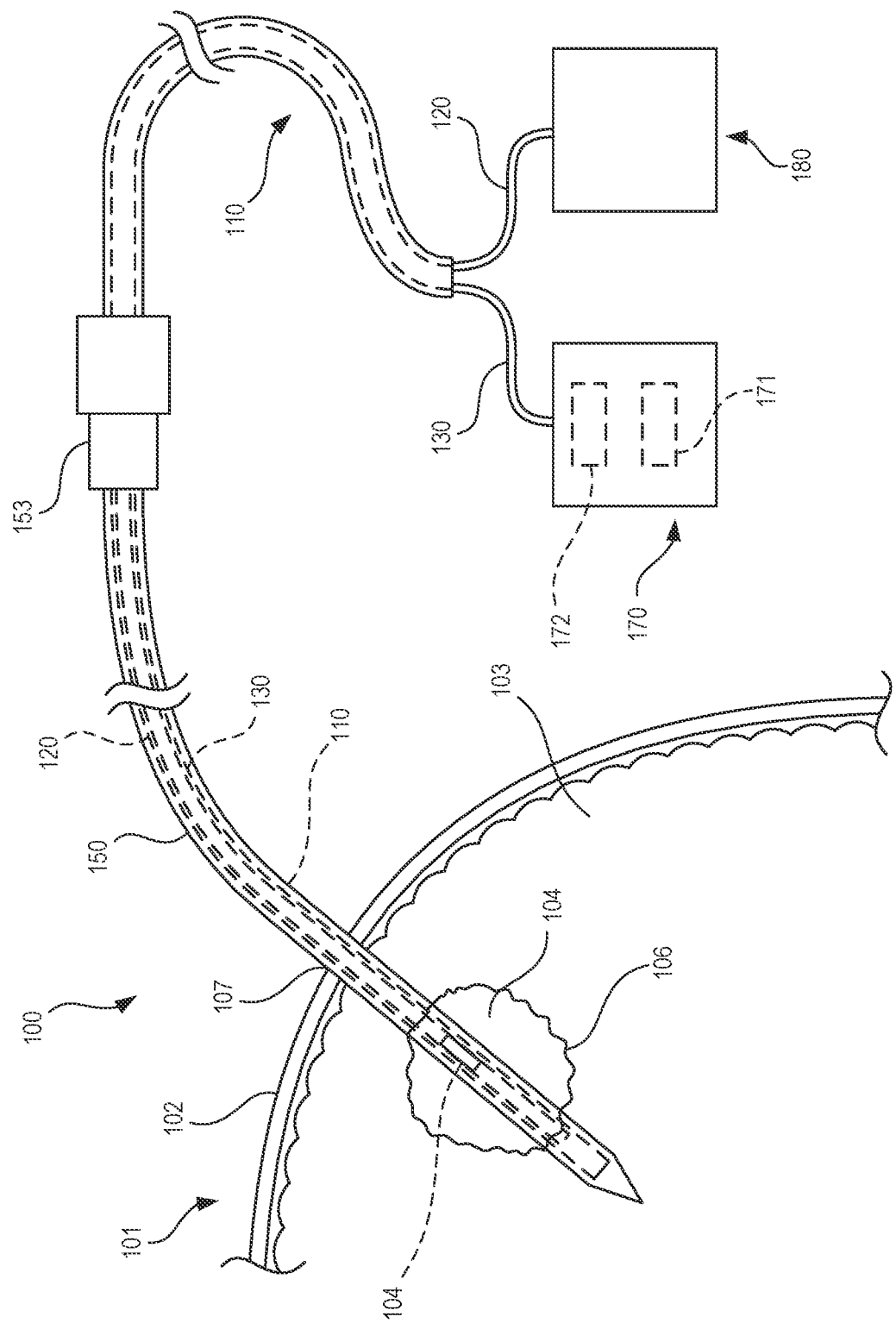
FIG. 4B is a partial cross-sectional view of the interstitial optical mapping system of FIG. 1 with a portion of the interstitial optical mapping system disposed within a tumor of a patient and the emitter optical fiber and the imaging optical fiber at a second discrete imaging position within the catheter.

The emitter optical fiber 120 and the imaging optical fiber 130 are translated along a length of the catheter 150, manually or automatically, to a second position, as depicted in FIG. 4B where a second position of the fluorescent dye associated with the tumor 104 is calculated. The emitter optical fiber 120 and the imaging optical fiber 130 may be continuously emitting and capturing light and/or images, or they may emit and capture light and/or images at discrete positions. A distance between a first discrete imaging position and a second discrete imaging position may range from about sub-millimeter to a few centimeters. For example, the range may be around a millimeter or sub-millimeter to confirm the position of a single boundary. In other embodiments, the range may be in one or more centimeters to span the length of the tumor. The range may also depend on the depth provided by the imaging fibers 120, 130. The emitter optical fiber 120 and the imaging optical fiber 130 may be translated further along the length of the catheter 150 to a plurality of imaging positions. The position of the fluorescent dye may be calculated by the processing unit 170 continuously or after each discrete movement.

In some embodiments, the imaging optical fiber is to capture images at a series of planned locations. The planned locations may be based a magnetic resonance image of the target tissue structure. In some embodiments, the imaging optical fiber is to capture an additional set of images at planned locations after a laser ablation procedure. For example, the planned locations after a previous laser ablation procedure may be based on the identified position of the target tissue structure used for the previous laser ablation procedure.

The calculated positions of the fluorescent dye are compiled by the processing unit 170 into an optical tumor map that represents the tumor 104, including the tumor margin 106.

In some embodiments, the processing unit 170 may output the optical tumor map to a graphical user interface (GUI) of an MR imaging system and correlate or overlay the optical map can and an MR image of the tumor 104.

The laser ablation plan can be generated manually by the practitioner or automatically by a laser ablation system based on the optical tumor map. The laser ablation plan can include a start position along the length of the catheter 150 to start ablation of the tumor 104; a stop position along the length of the catheter 150 to stop ablation of the tumor 104; at least one laser pull-back position disposed between the start position and the stop position along the length of the catheter 150 to ablate the tumor 104; and discrete laser ablation settings for the start position, the stop position, and each of the laser pull-back positions. The discrete laser ablation settings can include ablation time, laser frequency, laser amplitude, tumor temperature, ablation boundary, etc. Additionally, the discrete laser ablation setting may include temperature protection setting for non-target tissue. For example, the discrete laser ablation settings may include a maximum temperature threshold for tissue that is not supposed to be ablated. In certain embodiments, the at least one laser pull-back position can be an input for an automatic laser ablation device, such as an automatic laser fiber pull-back device configured to automatically pull back a laser fiber to each of the planned pull-back positions.

To perform the laser ablation procedure, the optical fiber probe may be removed from the catheter 150 and a laser probe may be inserted into the catheter 150. A laser ablation system may receive the laser ablation plan and execute the laser ablation plan. In some embodiments a robotic placement system, such as a laser fiber pull-back device, may be used to control the position of the laser probe in the catheter 150 based on the laser ablation plan. In some embodiments, the laser ablation system may be configured to change the amount of time or a power setting of the based on the location of the laser probe and the laser ablation plan.

In some embodiments, the interstitial optical tumor mapping system 100 is used to confirm laser ablation of a tumor and to create an optical image map of non-ablated tumor portions. The optical image map of the non-ablated tumor portions can be used to generate a laser ablation plan to ablate the non-ablated tumor portions. Following a laser ablation procedure, the emitter optical fiber 120 and the imaging optical fiber 130 may be disposed within the catheter 150 and moved continuously or incrementally along a length of the catheter 150 as previously described. The processing unit 170 may generate a post-ablation optical image map of the fluorescent dye associated with non-ablated tumor portions at each of the discrete imaging positions and calculate a position of the non-ablated portions. The processing unit 170 may generate a laser ablation plan to ablate the non-ablated tumor portions based on the post-ablation optical image map of the non-ablated tumor portions can be used to generate a laser ablation plan to ablate the non-ablated tumor portions, as previously described.

EXAMPLES SECTION

The following examples pertain to further embodiments.

Example 1. An optical tumor mapping system, comprising: an emitter optical fiber configured to emit light; an imaging optical fiber configured to receive light, wherein the emitter optical fiber and the imaging optical fiber are configured to be selectively slidingly disposed within a catheter; and a processing unit to: identify, via the light received by the imaging optical fiber, a position of a margin of a target tissue structure as the emitter optical fiber and the imaging optical fiber are moved along the catheter; and generate a laser ablation plan to guide a laser ablation procedure based on the identified position of the target tissue structure.

Example 2. The optical tumor mapping system of Example 1, further comprising an image sensor coupled to the processing unit and the imaging optical fiber.

Example 3. The optical tumor mapping system of Example 1, wherein the emitter optical fiber is configured to emit light from within the target tissue structure to excite a fluorescent dye associated with a tumor, and wherein the imaging optical fiber is configured to receive reflected light from the excited fluorescent dye.

Example 4. The optical tumor mapping system of Example 1, wherein the processing unit is configured to use the identified position of the margin to determine or confirm at least one of the following: a start position along the catheter to start ablation of the target tissue structure; a stop position along the catheter to stop ablation of the target tissue structure; or a laser pull-back position disposed between the start position and the stop position along the catheter to ablate the target tissue structure.

Example 5. The optical tumor mapping system of Example 4, wherein the laser ablation plan further includes discrete laser ablation settings for each of the start position, the stop position, and the laser pull-back position, and wherein the processing unit is configured to use the identified position of the target tissue structure margin to determine or confirm at least one of the discrete laser ablation setting.

Example 6. The optical tumor mapping system of Example 5, wherein the discrete laser ablation settings include any one of ablation time, laser frequency, laser amplitude, tumor temperature; ablation boundary, or any combination thereof.

Example 7. The optical tumor mapping system of Example 5, further comprising an ablation device in communication with the processing unit, the ablation device to adjust a discrete laser ablation setting based on the laser ablation plan and a position of a laser probe along the catheter.

Example 8. The optical tumor mapping system of Example 1, wherein the emitter optical fiber and the imaging optical fiber are translatable relative to the catheter.

Example 9. The optical tumor mapping system of Example 1, wherein the imaging optical fiber is operably coupled to the processing unit and the processing unit is further to perform a spectral analysis to calculate a position of a margin of a tumor.

Example 10. The optical tumor mapping system of Example 9, wherein the processing unit is further to correlate the calculated position of the margin of the tumor with magnetic resonance imaging data of the tumor, and overlay the calculated position of the margin of the tumor on a magnetic resonance image on a graphical user interface.

Example 11. The optical tumor mapping system of Example 1, wherein following ablation of the target tissue structure, the processing unit is further to: identify, via the light received by the imaging optical fiber, a position of non-ablated tumor portions as the emitter optical fiber and the imaging optical fiber are moved along the catheter; map the position of the non-ablated tumor portions along the length of the catheter; and generate a post-ablation laser ablation plan to guide a second laser ablation procedure based on the mapped position of the non-ablated tumor portions.

Example 12. The optical tumor mapping system of Example 1, wherein the laser ablation plan is an input to a laser ablation device and a laser fiber pull-back device.

Example 13. The optical tumor mapping system of Example 1, wherein the target tissue structure is a tumor.

Example 14. The optical tumor mapping system of Example 13, wherein the processing unit is further to map a position of the tumor margins along a length of the catheter.

Example 15. The optical tumor mapping system of Example 1, wherein to identify the position of the margin, the imaging optical fiber is to capture light at a plurality of locations along the catheter.

Example 16. The optical tumor mapping system of Example 1, wherein the imaging optical fiber is to capture images at a series of planned locations, and wherein the planned locations are based a magnetic resonance image of the target tissue structure.

Example 17. The optical tumor mapping system of Example 1, wherein the imaging optical fiber is to capture an additional set of images at planned locations after the laser ablation procedure, and wherein the planned locations are based on the identified position of the target tissue structure used for the laser ablation plan.

Example 18. A method of planning a tumor ablation procedure, comprising: exciting a fluorescent dye with light emitted from an emitter optical fiber from within a catheter disposed within a target tissue structure; receiving reflected light from the excited fluorescent dye with an imaging optical fiber; identifying a position of a margin of a target tissue structure along a length of the catheter based on the reflected light; and generating a laser ablation plan to guide a laser ablation procedure based on the identified position of the margin of the target tissue structure along the length of the catheter.

Example 19. The method of Example 18, further comprising: positioning the emitter optical fiber and the imaging optical fiber at a first position relative to the target tissue structure; translating the emitter optical fiber and the imaging optical fiber to a plurality of discrete positions along the length of the catheter; and identifying tissue as either part of a tumor or non-tumorous tissue at each of the discrete positions.

Example 20. The method of Example 18, wherein mapping the position of the margin of the target tissue structure comprises: receiving data from the imaging optical fiber by a processing unit; and performing a spectral analysis of the data.

Example 21. The method of Example 18, further comprising imaging the target tissue structure with magnetic resonance imaging, and correlating an optical tumor map with the magnetic resonance image of the target tissue structure.

Example 22. The method of Example 18, wherein the laser ablation plan includes laser ablation settings for positions along the catheter, wherein the laser ablation settings include any one of ablation time, laser frequency, laser amplitude, tumor temperature, ablation boundary, or any combination thereof.

Example 23. The method of Example 18, further comprising: identifying, via the light received by the imaging optical fiber, a position of non-ablated tumor portions as the emitter optical fiber and the imaging optical fiber are moved along the catheter; mapping the position of the non-ablated tumor portions along the length of the catheter; and generating the laser ablation plan to guide the laser ablation procedure based on the mapped position of the non-ablated tumor portions.

Example 24. The method of Example 18, wherein the target tissue structure is a tumor.

Example 25. The method of Example 18, further comprising mapping a position of the margin of the target tissue structure along a length of the catheter to create an optical structure map.

Example 26. The method of Example 18, wherein to identifying the position of the margin comprises using the imaging optical fiber is to capture images at a plurality of locations along the catheter.

Example 27. The method of Example 18, wherein identifying the position of the margin comprises using the imaging optical fiber to capture images at a series of planned locations, and wherein the planned locations are based a magnetic resonance image of the target tissue structure.

Example 28. The method of Example 18, further comprising using the imaging optical fiber to capture an additional set of images at planned locations after the laser ablation procedure, wherein the planned locations are based on the identified position of the target tissue structure used for the laser ablation plan.

Example 29. A method of confirming ablation of a tumor, comprising: emitting a light from within the ablated tumor with an emitter optical fiber to excite a fluorescent dye associated with non-ablated portions of the tumor; receiving a reflected light from the excited fluorescent dye with an imaging optical fiber; and mapping a position of the non-ablated portions along a length of the catheter with a processing unit.

Example 30. The method of Example 29, further comprising: positioning the emitter optical fiber and the imaging optical fiber at a first position within the ablated tumor; translating the emitter optical fiber and the imaging optical fiber to a plurality of discrete positions along the length of the catheter; and mapping the position of the non-ablated portions at each of the discrete positions.

Example 31. The method of Example 30, wherein positioning and translating are performed via an automatic positioning system.

Example 32. The method of Example 30, wherein positioning and translating are performed manually while a tracking system identifies the location of the emitter optical fiber and the imaging optical fiber.

Example 33. The method of Example 30, wherein positioning and translating are performed manually.

Example 34. The method of Example 29, further comprising imaging the ablated tumor with magnetic resonance imaging and correlating the map of the position of the non-ablated portions with the magnetic resonance image of the ablated tumor.

Example 35. The method of Example 29, wherein the laser ablation plan includes laser ablation settings for positions along the catheter, wherein the laser ablation settings include any one of ablation time, laser frequency, laser amplitude, tumor temperature, ablation boundary, or any combination thereof.

Example 36. A system for confirming ablation of a tumor, comprising: an emitter optical fiber configured to emit light; an imaging optical fiber configured to receive light, wherein the emitter optical fiber and the imaging optical fiber are configured to be selectively slidingly disposed within a catheter; and a processing unit to: cause the emitter optical fiber to emit a light from within an ablated tumor to excite a fluorescent dye associated with non-ablated portions of the tumor, wherein the ablated tumor was ablated according to a prior laser ablation plan; process data associated with a reflected light received by the imaging optical fiber to detect a presence of the non-ablated portions; wherein when the presence of the non-ablated portions is not detected, the processing unit is to confirm the prior ablation procedure was successful; and wherein when the presence of the non-ablated portions is detected the processing unit is to: map a position of the non-ablated portions along a length of the catheter with a processing unit; and generate a supplemental laser ablation plan for an additional ablation procedure.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. An optical tumor mapping system, comprising:
an emitter optical fiber configured to emit light;
an imaging optical fiber configured to receive light, wherein the emitter optical fiber and the imaging optical fiber are configured to be selectively slidingly disposed within a catheter; and
a processor configured to:
generate, via the light received by the imaging optical fiber as the emitter optical fiber and the imaging optical fiber are moved along the catheter, a computerized representation of a margin of a target tissue structure,
wherein the light received by the imaging optical fiber is received while the emitter optical fiber and the imaging optical fiber are at a first position within the catheter and at a second position within the catheter, while the catheter penetrates entirely through the target tissue structure,
wherein the first position is at a distal end of the catheter that has penetrated entirely through the target tissue structure such that, in the first position, the imaging optical fiber and the emitter optical fiber are in a region of the catheter that is outside the target tissue structure,
wherein the second position is further away from the distal end of the catheter than the first position such that, in the second position, the imaging optical fiber and the emitter optical fiber are in a region of the catheter that is within the target tissue structure, and
wherein the processor is configured to perform a spectral analysis on the light received by the imaging optical fiber at the first position and the second position to generate the computerized representation of the margin of the target tissue structure, and to identify non-cancerous tissue; and
generate a laser ablation plan to guide a laser ablation procedure based on the computerized representation of the margin of the target tissue structure and the identified non-cancerous tissue.

2. The optical tumor mapping system of claim 1, wherein the catheter comprises markers, wherein the processor is configured to determine the first position and the second position of the imaging optical fiber based on the markers, wherein the target tissue structure corresponds to a tumor, wherein the emitter optical fiber is configured to emit light to excite a fluorescent dye associated with the tumor, and wherein the light received by the imaging optical fiber includes light reflected from the excited fluorescent dye.

3. The optical tumor mapping system of claim 1, wherein the processor is configured to use the computerized representation of the margin of the target tissue structure to determine or confirm the following:
   a start position along the catheter to start ablation of the target tissue structure;
   a stop position along the catheter to stop ablation of the target tissue structure; or
   a laser pull-back position disposed between the start position and the stop position along the catheter to ablate the target tissue structure.

4. The optical tumor mapping system of claim 3, wherein the laser ablation plan further includes discrete laser ablation settings for each of the start position, the stop position, and the laser pull-back position, and wherein the processor is configured to use the computerized representation of the margin of the target tissue structure to determine or confirm at least one of the discrete laser ablation settings.

5. The optical tumor mapping system of claim 4, wherein the discrete laser ablation settings include any one of ablation time, laser frequency, laser amplitude, tumor temperature, ablation boundary, or any combination thereof.

6. The optical tumor mapping system of claim 4, wherein the processor is configured to adjust a discrete laser ablation setting based on the laser ablation plan and a position of a laser probe along the catheter.

7. The optical tumor mapping system of claim 1, wherein the processor is further configured to correlate the computerized representation of the margin of the target tissue structure with magnetic resonance imaging data of the target tissue structure, and overlay the computerized representation of the margin of the target tissue structure on a magnetic resonance image on a graphical user interface.

8. The optical tumor mapping system of claim 1, wherein the target tissue structure corresponds to a tumor, and wherein following ablation of the target tissue structure, the processor is further configured to:
   identify, via the light received by the imaging optical fiber, a position of non-ablated tumor portions as the emitter optical fiber and the imaging optical fiber are moved along the catheter;
   map the position of the non-ablated tumor portions along the length of the catheter; and
   generate a post-ablation laser ablation plan to guide a second laser ablation procedure based on the mapped position of the non-ablated tumor portions.

9. The optical tumor mapping system of claim 1, wherein the processor is configured to control the imaging optical fiber to capture images at a series of planned positions including the first position and the second position, and wherein the planned positions are based on a magnetic resonance image of the target tissue structure.

10. The optical tumor mapping system of claim 1, wherein the processor is configured to control the imaging optical fiber to capture an additional set of images at planned locations after the laser ablation procedure, and wherein the planned locations are based on the computerized representation of the margin of the target tissue structure used for the laser ablation plan.

11. The optical tumor mapping system of claim 1, wherein the light received with the imaging optical fiber has a wavelength between 620 nm-710 nm, and wherein the emitted light has a wavelength between 380 nm-450 nm.

12. A method of planning a tumor ablation procedure, comprising:
   causing a catheter to penetrate through a target tissue structure;
   exciting a fluorescent dye with light emitted from an emitter optical fiber from within the catheter while disposed within the target tissue structure;
   receiving reflected light from the excited fluorescent dye with an imaging optical fiber,
      wherein receiving the reflected light with the imaging optical fiber occurs while the emitter optical fiber and the imaging optical fiber are at a first position within the catheter and at a second position within the catheter, while the catheter penetrates entirely through the target tissue structure,
      wherein the first position is at a distal end of the catheter that has penetrated entirely through the target tissue structure such that, in the first position, the imaging optical fiber and the emitter optical fiber are in a region of the catheter that is outside the target tissue structure,
      wherein the second position is further away from the distal end of the catheter than the first position such that, in the second position, the imaging optical fiber and the emitter optical fiber are in a region of the catheter that is within the target tissue structure; and
   performing a spectral analysis on the reflected light received by the imaging optical fiber at the first position and the second position to generate a computerized representation of a margin of the target tissue structure, and to identify non-cancerous tissue; and
   generating a laser ablation plan to guide a laser ablation procedure based on the computerized representation of the margin of the target tissue structure and the identified non-cancerous tissue.

13. The method of claim 12, further comprising:
   positioning the emitter optical fiber and the imaging optical fiber at the first position;
   translating the emitter optical fiber and the imaging optical fiber to a plurality of discrete positions, including the second position, along the length of the catheter; and
   identifying tissue as either part of a tumor or non-tumorous tissue at each of the discrete positions.

14. The method of claim 12, further comprising:
   imaging the target tissue structure with magnetic resonance imaging; and
   correlating the computerized representation of the margin of the target tissue structure with the magnetic resonance image of the target tissue structure.

15. The method of claim 12, wherein the laser ablation plan includes laser ablation settings for positions along the catheter, wherein the laser ablation settings include any one of ablation time, laser frequency, laser amplitude, tumor temperature, ablation boundary, or any combination thereof.

16. The method of claim 12, further comprising:
   identifying, via the light received by the imaging optical fiber, a position of non-ablated tumor portions as the emitter optical fiber and the imaging optical fiber are moved along the catheter;
   mapping the position of the non-ablated tumor portions along the length of the catheter; and
   generating the laser ablation plan to guide the laser ablation procedure based on the mapped position of the non-ablated tumor portions.

17. The method of claim 12, further comprising rendering the computerized representation of the margin of the target tissue structure to a graphical user interface.

18. The method of claim 12, further comprising using the imaging optical fiber to capture an additional set of images at planned locations after the laser ablation procedure, wherein the planned locations are based on the computerized representation of the margin of the target tissue structure used for the laser ablation plan.

19. A system for confirming ablation of a tumor, comprising:
   an emitter optical fiber configured to emit light;
   an imaging optical fiber configured to receive light, wherein the emitter optical fiber and the imaging optical fiber are configured to be selectively slidingly disposed within a catheter; and
   a processor configured to:
      generate, via the light received by the imaging optical fiber as the emitter optical fiber and the imaging optical fiber are moved along the catheter, a computerized representation of a margin of a tumor,
         wherein the light received by the imaging optical fiber is received while the emitter optical fiber and the imaging optical fiber are at a first position within the catheter and at a second position within the catheter, while the catheter penetrates entirely through tumor,
         wherein the first position is at a distal end of the catheter that has penetrated entirely through the tumor such that, in the first position, the imaging optical fiber and the emitter optical fiber are in a region of the catheter that is outside the tumor,
         wherein the second position is further away from the distal end of the catheter than the first position such that, in the second position, the imaging optical fiber and the emitter optical fiber are in a region of the catheter that is within the tumor, and
         wherein the processor is configured to perform a spectral analysis on the light received by the imaging optical fiber at the first position and the second position to generate the computerized representation of the margin of the tumor, and to identify non-cancerous tissue;
      generate a first laser ablation plan to guide a first laser ablation procedure based on the computerized representation of the margin of the tumor and the identified non-cancerous tissue;
      cause the emitter optical fiber to emit light from within an ablated portion of the tumor to excite a fluorescent dye associated with non-ablated portions of the tumor, wherein the ablated portion of the tumor was ablated according to the first laser ablation plan; and
      process data associated with reflected light received by the imaging optical fiber to detect a presence of the non-ablated portions;
   wherein when the presence of the non-ablated portions is not detected, the processor is configured to confirm the first laser ablation procedure was successful; and
   wherein when the presence of the non-ablated portions is detected the processor is configured to:
      map a position of the non-ablated portions along a length of the catheter; and
      generate a supplemental laser ablation plan for an additional ablation procedure.

* * * * *